United States Patent [19]
Gardner

[11] 3,787,105
[45] Jan. 22, 1974

[54] TILTING PAD JOURNAL BEARING
[75] Inventor: Willis W. Gardner, Waukesha, Wis.
[73] Assignee: Waukesha Bearing Corporation, Waukesha, Wis.
[22] Filed: Dec. 4, 1972
[21] Appl. No.: 312,141

[52] U.S. Cl. .................... 308/73, 115/34, 308/36.1
[51] Int. Cl. ...................... F16c 17/06, F16c 33/74
[58] Field of Search .......... 308/36.1, 73, 72; 115/34

[56] References Cited
UNITED STATES PATENTS

| | | | |
|---|---|---|---|
| 3,470,842 | 10/1969 | Clay | 308/36.1 |
| 3,540,405 | 11/1970 | Clay | 308/36.1 |
| 3,718,378 | 2/1973 | Clay | 308/36.1 |
| 1,876,690 | 9/1932 | Kingsbury | 308/72 |
| 2,235,931 | 3/1941 | Kingsbury | 308/73 |
| 3,339,990 | 9/1967 | Wendt | 308/73 |
| 3,610,711 | 10/1971 | Mierley, Sr. | 308/73 |
| 3,711,169 | 1/1973 | Gardner | 308/73 |

Primary Examiner—Manuel A. Antonakas
Assistant Examiner—Barry Grossman
Attorney, Agent, or Firm—Arthur L. Morsell, Jr.

[57] ABSTRACT

A plurality of bearing pads are each tiltably engaged with the interior of a hollow, cylindrical bearing shell in circumferentially-spaced relationship therearound. Relatively hard bearing buttons, one on each pad, and a cooperating one for each pad on the interior of the bearing shell, are shaped on the adjacent surfaces to provide for tilting engagement between the corresponding pad and the interior of the shell. Each pair of buttons is held in place by a retainer which is removably fastened on one side to the exterior surface of the corresponding pad and is removably fastened on one end to the bearing shell. An annular flange projecting from the bearing shell is bolted to a supporting structure. The pads and shell are recessed to removably receive their corresponding bearing buttons, and a sloping ramp in the shell for each button guides the button into its recess so that each pad, along with its buttons and retainer, may be easily slid into place as a unit and may be easily removed as a unit.

10 Claims, 6 Drawing Figures

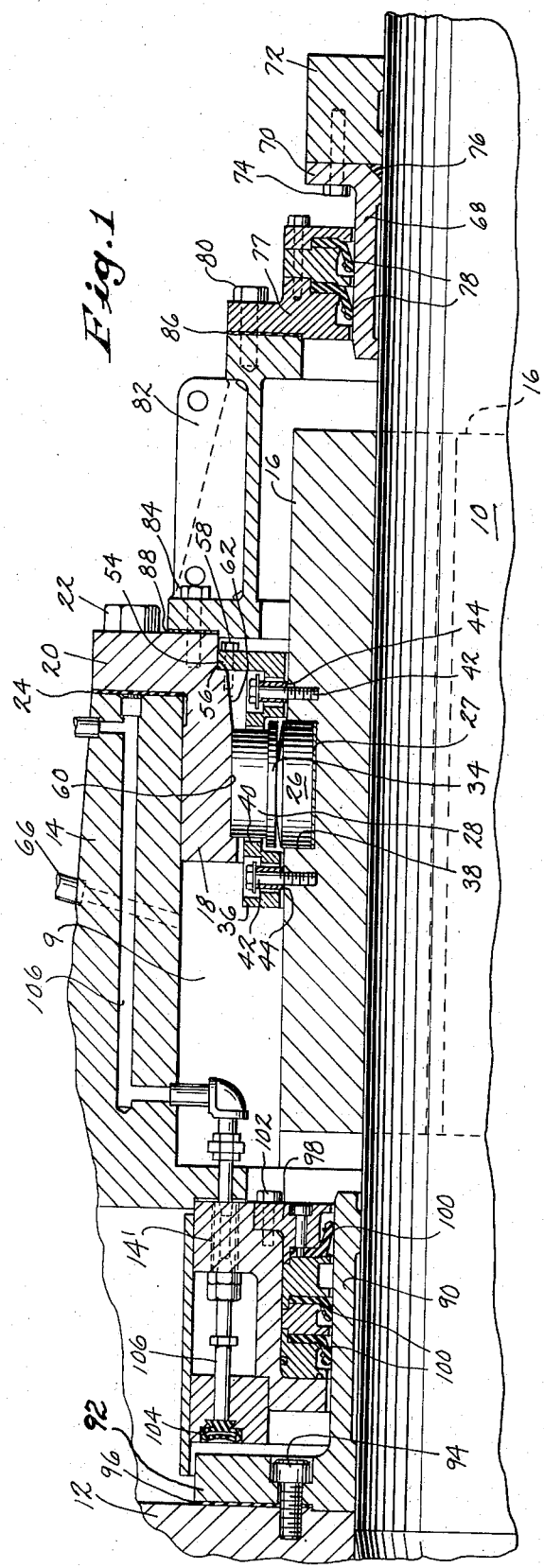
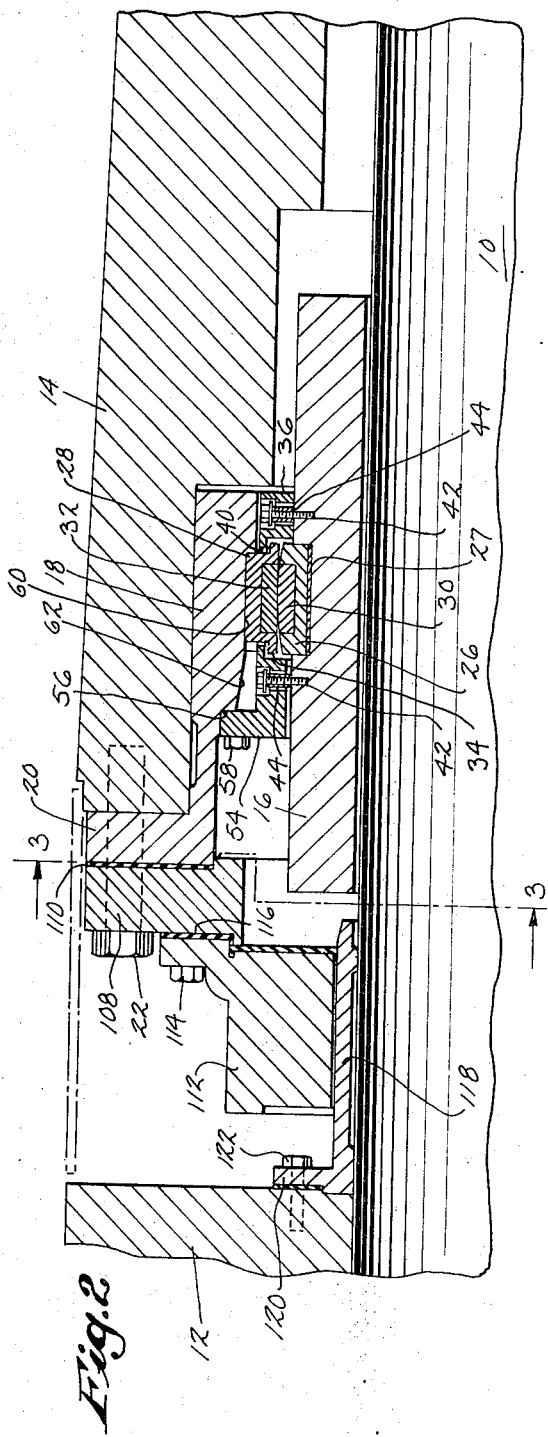

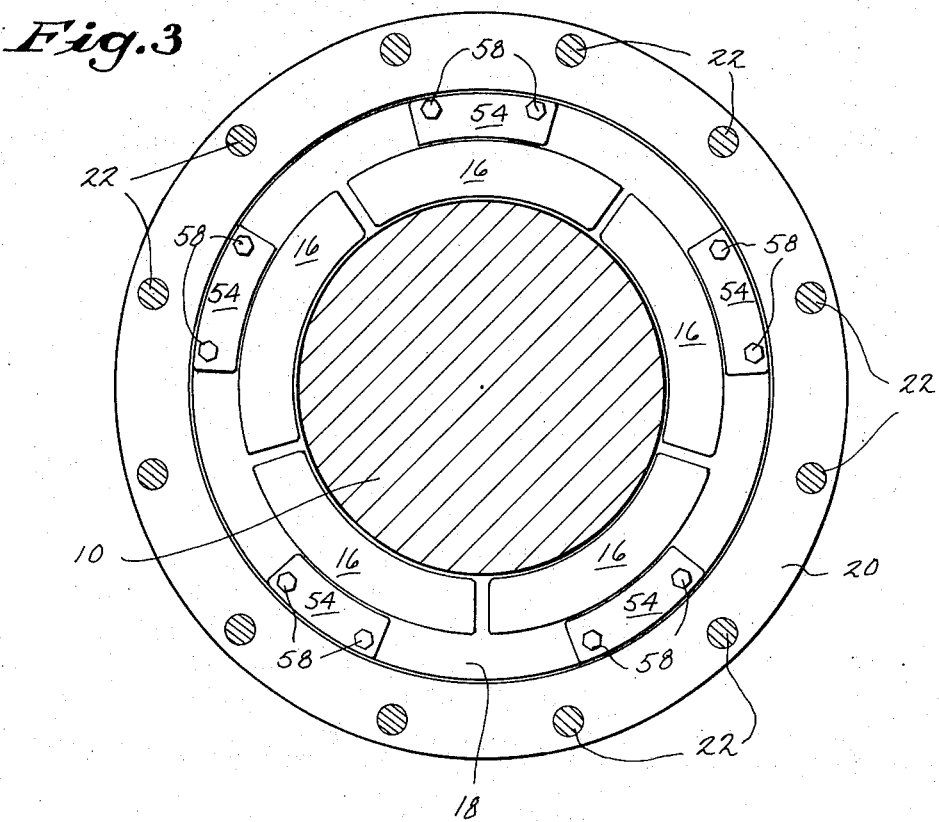
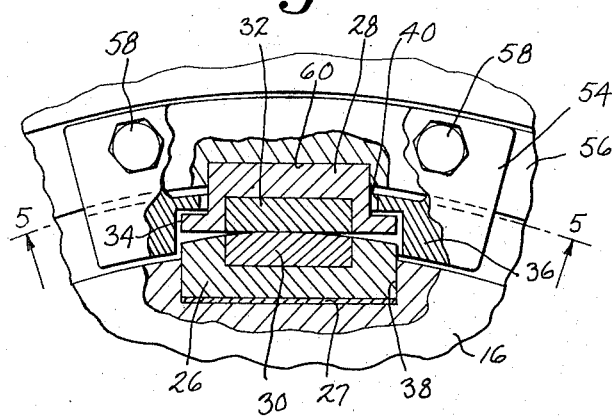
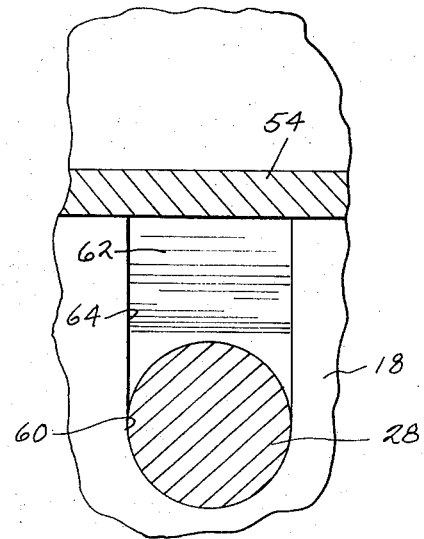
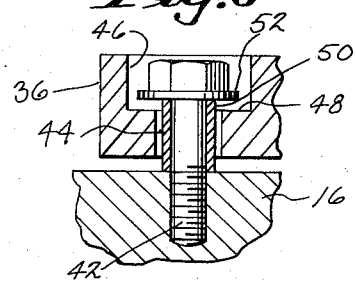

TILTING PAD JOURNAL BEARING

BACKGROUND OF THE INVENTION

This invention relates to tilting pad journal bearings in general and more particularly to the application of such bearings to the stern tubes of ocean-going ships, Great Lakes ships, tugs, harbor craft, or the like. Although tilting pad journal bearings have been widely used in the past in many different types of rotating machinery, their application to the stern tubes of ships is relatively recent, and the principal object of this invention is to provide a tilting pad journal bearing which is particularly adapted for use in stern tubes. The tilting pad journal bearing of this invention may, however, also have use in other applications.

Tilting pad journal bearings contain a hollow, cylindrical bearing shell within which a plurality of arcuate bearings pads are tiltably supported in spaced circumferential relationship around the interior of the shell. The inner surface of each pad is curved to provide a bearing surface for a shaft which is journalled through the circle of bearing pads. Oil lubrication is applied between the shaft and the pads to provide an oil film upon which the shaft rotates. Since the bearing pads are all tiltable, they automatically align themselves with the shaft within their limits of movement and continuously maintain this alignment in spite of changes in the relative shaft to hull position as may result from shaft vibration or wobble, or deflections of the shaft and/or hull. This self-aligning feature makes the tilting pad bearings particularly useful in stern tubes since it simplifies installation of the bearing and reduces bearing wear due to shaft deflection, which is inherent in stern tubes because of the heavy propeller. Also, the pad-type bearing is easier to remove than the full journal bearing for inspection or repair.

The tiltable connection between the bearing pads and bearing shell concentrates all the force carried by each bearing pad in the small area at which the pad makes tiltable contact with the shell. Therefore, to avoid excessive wear at the contact area, it has been conventional in the past to mount a pair of relatively hard bearing buttoms between each pad and the interior of the shell at the point of tiltable contact. The hard bearing buttons are in face-toface contact with each other and at least one of them is spherically shaped to provide a tiltable contact thereinbetween.

The prior art tilting pad bearings also include a lubrication pumping system for circulating oil around the bearing to maintain it in a flood lubricated condition, and, in stern tubes, a forward and aft seal which engage the shaft to keep the oil from leaking out along the shaft and also to keep water from entering the bearing.

In the application of tilting pad bearings to stern tubes, one major problem relates to the accessibility of the stern tube bearing and after stern tube seal for inspection and/or repair. In the past, both with full journal bearings and tilting pad journal bearings, it has been necessary to place the ship in dry dock in order to inspect or repair the bearing or the stern tube seal. This is a relatively expensive and time-consuming procedure, particularly with large ships, and has been necessitated by the fact that the stern tube bearing could not be removed forwardly from the interior of the ship to provide access to the aft stern tube seal, whereby the aft stern tube seal had to be mounted for access from the stern, which in turn required dry docking. Accordingly, one object of this invention is to provide a tilting pad stern tube bearing assembly which can be easily removed from the interior of the ship for inspection and/or repair of the bearing or its aft stern tube seal.

Another object of this invention is to provide a tilting pad stern tube journal bearing that can be easily dismantled, either in the inboard or outboard direction, to permit inspection of the shaft or the pads or for replacement of the pads.

Another object of this invention is to provide a tilting pad journal bearing in which the hardened bearing buttons thereof are secured in place by improved retainers which hold the buttons in tiltable engagement with each other adjacent to the other surface of the corresponding pad and also movably secure the pad to the surrounding bearing sleeve.

An additional object of this invention is to provide a tilting pad journal bearing in which one end of the bearing shell is flanged and drilled to be removably fastened to a supporting structure, the fastening means being accessible from the flanged end of the shell.

Another object of this invention is to provide a tilting pad journal bearing in which each hardened bearing button thereof is removably secured to the outer surface of the corresponding pad, and in which a plurality of sloping ramp surfaces are formed in the interior of the bearing shell, one for each outer bearing button, for slideably engaging said bearing button and guiding it into position as a bearing pad is being slid into position within the inner periphery of the bearing shell.

A further object of this invention is to provide a tilting pad journal bearing in which the retainers that secure the hardened buttons thereof to the exterior surface of the tilting pads are flanged and drilled at one end to be removably fastened to the bearing shell.

SUMMARY OF THE INVENTION

In accordance with this invention, the above-noted objects are achieved by providing in a tiltable pad journal bearing wherein there is a pair of buttons for each pad, an improved construction wherein the buttons are removably held in place by a retainer which is fastened on one side to the exterior surface of the corresponding pad and which is fastened on one end to the shell, the latter having an annular flange which is bolted to a supporting structure. The pads and shell are recessed to removably receive their coresponding buttons and, in the preferred embodiment, a sloping button guiding ramp communicates with each button recess in the shell so that each pad, along with its buttons and retainer, may be easily slid into place as a unit and may be easily removed as a unit.

DESCRIPTION OF THE DRAWINGS

FIG. 1 is an axial sectional view of a portion of one illustrative tilting pad journal bearing of this invention installed in a stern tube and positioned for inboard removal;

FIG. 2 is an axial sectional view of a second tilting pad journal bearing of this invention installed in a stern tube and positioned for outboard removal;

FIG. 3 is a cross-sectional view taken upon the line 3—3 of FIG. 2;

FIG. 4 is an enlarged fragmentary detail view, parts being broken away and shown in section to show the hardened bearing buttons which are positioned between each bearing pad and the bearing shell;

FIG. 5 is a developed detailed view taken along the curved line 5—5 of FIG. 4 and showing one of the slots formed in the inner periphery of the bearing shell to receive one of the hardened bearing buttons; and FIG. 6 is an enlarged fragmentary detail view showing one of the bolts which fasten a bearing button retainer to its corresponding bearing pad.

DESCRIPTION OF THE PREFERRED EMBODIMENTS

In FIG. 1, the stern tube portions of an ocean-going vessel or the like include a stern shaft 10, whose inboard portion is on the right-hand side of the figure and whose outboard portion is on the left-hand side of the figure, and a propeller having a hub 12 which is fastened to the outboard end of the stern shaft 10 by a suitable conventional means not shown in the drawing. The tilting pad journal bearing of this invention is attached to the annular frame portion 14 of the ship, there being an annular housing 14' for the aft seal attached thereto.

The complete bearing assembly includes the bearing per se, an oil lubrication system, and a forward seal and aft seal for preventing leakage of oil out of the bearing and also for preventing water from entering the bearing. Portions of all of these elements are shown in FIG. 1.

In this particular embodiment of the invention, the tilting pad journal bearing per se includes a plurality of bearing pads 16 which are spaced around the shaft 10 and are each tiltably engaged with the interior of a hollow, cylindrical bearing shell 18. Bearing shell 18 has an outwardly projecting, annular flange 20 at its inboard end which is drilled to receive bolts 22 and is removably secured thereby to the stern frame 14 of the ship. An annular resilient gasket 24 is positioned between flange 20 and the adjacent surface of frame 14 to prevent oil from leaking out at the joint therebetween. The flange 20 is a particularly important feature of this invention with regard to the accessibility and removability of the bearing. In the past, the bearing shell was press-fitted into an opening in the stern frame and therefore required access from the stern of the ship in order to be removed. This required placing the ship in dry dock, which is a relatively expensive and time-consuming operation, particularly with large ships. In accordance with this invention, however, this expensive and time-consuming procedure is eliminated and easy accessibility and removability is provided for the bearing shell 18 from the inboard side of the shell. The other portions of the bearing assembly of this invention are also adapted for removability from the interior of the ship as will be described hereinafter.

The tiltable connection between each bearing pad 16 and the interior of the bearing shell 18 is effected through bearing buttons 26 and 28 which are engaged with each other between the exterior surface of each pad 16 and the adjacent interior surface of the shell 18. As shown in FIG. 4, the bearing buttons 26 and 28 contain hardened inserts 30 and 32 at their points of contact. The material for hardened inserts 30 and 32 is a relatively hard material such as tungsten carbide or the like which is capable of handling the concentrated forces communicated at the point of contact between the two bearing buttons 26 and 28 with a minimum of deformation and wear. The outer surface of lower bearing button 26 and its hardened insert disc 30 are spherically shaped so as to make tiltable contact with the adjacent surface of the outer bearing button 28 and its hardened insert disc 32. It will be understood, of course, that the surface of button 28 and its hardened insert disc 32 could also be spherically shaped if desired, and, in this case, the adjacent surface of lower bearing button 26 and its hardened insert disc 30 could be flat. It is important that the hardened portion of the two bearing button surfaces make tiltable contact with each other, but the particular shape or combination of shapes which are employed to achieve this end may vary in different applications. Shims 27 between the buttons 26 and pads 16 are used primarily to establish final shaft to pad clearances in assembly.

Each outer bearing button 28 has an outwardly projecting annular flange 34 which extends around its contacting end for engaging a retainer 36 that holds both of the bearing buttons 26 and 28 adjacent to the exterior surface of the corresponding bearing pad 16 over a cylindrical recess 38 formed therein to receive the pad bearing button 26. Each retainer 36 has a circular opening 40 which is slightly larger than the upper portion of bearing button 28 but smaller than the flange 34 so that the bearing button 28 can project loosely therethrough and yet be restrained from moving all the way through. Each retainer 36 is removably and loosely connected to the exterior surface of a corresponding bearing pad 16 by bolts 42 which extend through opening 44 in the retainer 36 and engage threaded openings in the upper surface of bearing pad 16 adjacent to the lower bearing button 26. FIG. 6 shows an enlarged view of the structure adjacent to one of the bolts 42.

Referring to FIG. 6, the structure of each retainer 36 adjacent to the bolts 42 is shaped and dimensioned to provide a relatively loose connection between the retainer 36 and the bearing pad 16 so that the bearing pad 16 will be free to tilt with respect to the retainer 36 by a predetermined amount. Countersunk openings 46 which are larger than the heads of the bolts 42 are formed in the upper surface of retainer 36 above the opening 44 and terminate in bottoms 48. Rigid spacer sleeves 50 which are long enough to space the heads of bolts 42 above the bottom surface 48 are positioned around the shanks of bolts 42. Washers 52 are held between the tops of spacer sleeves 50 and the heads of bolts 42. The space between the bottom of each washer 52 and the surface 48 is controlled by the length of the spacer sleeves 50, and this length is selected to provide a predetermined amount of radical movability of the retainer 36 before the washers 52 engage the surfaces 48 to limit the radial movement thereof. A predetermined amount of circumferential movability of each retainer 36 is provided by making the diameter of the openings 44 larger than the outside diameter of spacer sleeves 50 by a predetermined amount. Taken together, the above-noted clearances permit a predetermined amount of tiltability between each bearing pad 16 and its retainer 36 without interfering with the retainer's function of holding the two bearing buttons 26 and 28 in place against the exterior surface of pad 16 when the pad is removed from the bearing shell 18.

The above-noted clearances which allow tiltability of the pads 16 are the same around all of the bolts 42.

Each retainer 36 has an outwardly-directly flange 54 which seats against a recessed surface 56 on the forward end of bearing shell 18 and is removably attached thereto by means of bolts 58. This holds each retainer 36 rigidly against the forward or inboard edge of the bearing shell 18 in a predetermined circumferential position.

Each outer bearing button 28 seats in a recess 60 formed in the inner surface of bearing shell 18 and each recess communicates with the flanged end of bearing shell 18 through sloping ramp surface 62. The relationship between one outer bearing button 28, recess 60, and sloping ramp surface 62 as seen from the interior of the bearing shell 18 is disclosed in FIG. 5. Taken together, each arcuate recess 60 and sloping ramp surface 62 forms a slot 64 in the interior of the bearing shell 18 with the leading edge of each slot 64 sloping and with the trailing edge rounded on a slightly larger radius than the radius of bearing button 28.

In assembling the bearing, the bearing buttons 26 and 28 are loosely attached to the outer surface of bearing pads 16 while the pads are withdrawn from the bearing sleeve 18. The bearing pads 16 are then slid into place between the shaft 10 and the bearing sleeve 18 at the proper circumferential position, which is determined by aligning the openings in the retainer flanges 54 which receive the bolts 58 with the corresponding openings in the inboard face of bearing sleeve 18. As each bearing pad 16 is moved into place, the outer surface of bearing button 28 engages the sloping ramp portion 62 of a slot 64, and this guides the bearing button 28 into its proper position within the curved recess 60. Accordingly, it will be seen that the ramp surfaces 62 perform an important function in the assembly of the bearing and permit the pads 16 and retainers 36 to be slid into position without having to be in exact alignment at the start of the movement.

The foregoing description of the detailed structure for tiltably attaching one pad 16 to the inner periphery of bearing shell 18 applies to all of the pads 16, which each have a corresponding pair of hardened bearing buttons 26 and 28 along with a retainer 36 and recesses 38 and 60 in the pads 16 and bearing shell 18 for receiving the bearing buttons 26 and 28 as described above. In this particular embodiment of the invention, five bearing pads 16 are used, as shown in FIG. 3, but it will be clear to those skilled in the art that a larger or smaller number of pads could be used depending on the size of the shaft and other prior art design factors. It will be equally clear that this invention is applicable to each individual pad involved regardless of the number.

In the operation of the above-described tilting pad journal bearing, the bearing is flood lubricated to provide an oil film between the shaft 10 and each of the tilting pads 16 so that the shaft rides on a hydrodynamic oil film during operation, whereby the friction developed is only that force required to shear the oil within the film in the bearing clearance. This oil is applied to the cavity in which the bearing is located by means of an oil conduit 66 (see FIG. 1) which receives oil under pressure from a suitable pump which is not shown in the drawings. The oil fills the annular chamber 9 between the aft seal and the forward seal. An oil outlet conduit (not shown) is coupled to the chamber 9 to convey the used oil back to the oil pump to be recirculated back through the oil inlet conduit 66. The oil outlet conduit is not shown in the drawings since oil lubrication systems for tilting stern tube bearings are old and well known in the art and are not related to the problems of installing and removing the bearing and its associated elements.

The complete bearing assembly includes forward oil seal and aft oil seal which are described herein since they are involved in the process of assembling and disassembling the bearings. Both the forward and the aft seals includes a seal liner sleeve that is rigidly attached to the shaft and rotates therewith and a plurality of annular, resilient, lip-type seals which bear against the outer surface of the liner sleeve as it rotates. The purpose of the linear sleeve is to provide a material which lowers the coefficient of friction between the seals and the adjacent rotating part so as to reduce the heat generated by rotation and the resulting degradation of the seals. The liner also provides for elimination of wear to the relatively soft shaft should the seal rings be arranged to ride directly on the shaft.

Referring to FIG. 1, the forward seal liner sleeve 68 which has an outwardly projecting annular flange 70 is attached to a split-ring clamp 72 by bolts 74. The split-ring clamp 72 is clamped against the surface of shaft 10 by conventional bolts which are not shown in the drawing. An annular resilient O-ring 76 is clamped between a shoulder on the inner periphery of flange 70 and the facing surface of split ring 72 to prevent oil from leaking out around the inner periphery of seal liner 68. A lip seal assembly including two annular, resilient, lip-type seals 78 is positioned around the seal liner 68 and held in place by bolts 80 which connect it to annular split-ring mounting element 82. The mounting element 82 is supported by being attached to the front face of bearing shell 18 by means of bolts 84. A circular gasket 86 is positioned between the seal housing 77 and the supporting ring 82 to prevent passage of oil therein between and a circular gasket 88 is positioned between the mounting ring 82 and the front face of bearing shell 18 for the same reason.

The aft seal in this embodiment of the invention includes an aft seal liner sleeve 90 which has an outwardly projecting flange 92 at its after end. Seal liner 90 is attached to the propeller hub 12 by means of bolts 94 which extend through openings in flange 92. A circular gasket 96 is positioned between flange 92 and propeller hub 12 to prevent the entry of water there in between.

An aft seal assembly 98, containing three annular lip-type seals 100 which bear against the surface of seal liner sleeve 90, is attached to the aft seal housing 14' by means of bolts 102. Although the seal assembly 98 is not novel per se, its orientation for removability in the forward direction from the interior of the ship is novel inasmuch as such seal assemblies have heretofore been oriented for removal astern.

In addition to the forward and aft seal assemblies described above, this embodiment of the invention also includes means for blocking off the ingress of water into the stern tube when the aft seals are removed from the inboard direction. This means includes an inflatable annular collar 104 which is supported from the stern frame 14 facing the inboard surface of seal liner flange 92. The inflatable collar 104 is positioned close enough to the flange 92 so that it will, when inflated, entirely close the space between the flange 92 and the aft seal assembly all the way around the periphery of the flange 92. An air conduit 106 is coupled to the inflatable collar 104 for inflating the collar from a source of compressed air, there being a suitable manually operated valve, not shown in the drawings. A water drain, which is also not shown in the drawings, may be suitably located to drain the water adjacent the aft seal after the collar 104 has been inflated to seal off the ingress of water.

One of the principal objects of this invention is to provide a stern tube bearing assembly which is relatively easy to install and which can be easily removed from the interior of the ship for inspection and/or repair of the bearing of its aft stern tube seal. With regard to ease of assembly, the above-described embodiment is an improvement over those known heretofore because of the fact that the bearing shell 18 is slideably fitted within the corresponding opening in the stern frame 14 and is held in place by bolts which extend through the inboard flange of the bearing shell 18. In the past, the bearing shell was press-fitted into the opening in stern frame 14, which obviously complicated both the installation and removal processes. In addition, the process of installing the bearing of this invention is further expedited by means of the novel retainers 36, which removably secure the bearing buttons 26 and 28 to the outer surfaces of bearing pads 16, and by the sloping ramps 62 which guide the outer bearing buttons 28 into position when the pads 16 are slid into place between the shaft 10 and bearing shell 18.

In disassembling the above-described embodiment, for the purpose of inspecting the shaft 10 or inspecting and/or repaing the bearing, the oil is first drained from the bearing cavity, nd the forward seal is loosened and moved forwardly to expose the bearing pads 16. This is done by loosening the split-ring clamp 72, loosening the bolts 74 to allow the split-ring clamp 72 to open, sliding the clamp 72 and bearing seal liner 68 forward, and then by removing the bolts 80 the forward seal assembly 77 can also be moved forwardly on the shaft 10. Bolts 84 can then be removed and the split support element 82 removed in halves, thus exposing the bearing pads 16 to view and accessibility. If it is desired to remove any of the bearing pads 16, either to inspect the pad or to inspect the shaft beneath the pad, this can be done quite simply by removing the two bolts 58 which are easily accessible on the flange 54 of retainer 36. The pad 16, along with its associated bearing buttons 26 and 28 and the retainer 36, can then be easily slid forward as a unit and removed from the bearing assembly. The upper and side bearing pads can be removed without jacking the shaft 100 up, but if it is desired to remove the lower pads 16 which support the shaft, it will be necessary to temporarily support the shaft 10 with a jack. This will also be necessary if the bearing is to be moved forwardly to provide access to the aft seal assembly 98. In the latter case, however, it is not necessary to remove any of the bearing pads 16, since the entire bearing assembly can be freed for forward movement on the shaft 10 by removing the bolts 22 which secure the flange 20 of bearing shell 18 to the stern frame 14. Such forward movement of the bearing assembly exposes the forward edge of the aft seal assembly 98 to view, the bolts 102 which secure the aft seal assembly 98 to the stern frame 14 being exposed and readily accessible by means of a long wrench. Before the bolts 102 are removed, however, the inflatable collar 104 is inflated by compressed air through conduit 106 to seal off the ingress of water, and the cavity between flange 92 and stern frame 14 is drained of water. The bolts 102 can then be removed to remove the aft seal 98 for inspection or repair. After this has been completed, the bearing can be readily reassembled and the forward seal slid into place again with relatively little effort compared to the problems usually involved in dry-docking the ship and in removing the aft seal and bearing assembly from the outboard side.

Although it is preferable to install the tilting pad journal bearing of this invention for access from the interior of the ship, it is also possible to install the bearing for access from the exterior of the ship in cases where this is required. In such an application, the tilting pad bearing structure of this invention has the advantages of ease of installation and removal without requiring the removal of the stern shaft as has been customary with the prior art bearing structures. FIG. 2 is a fragmentary cross-sectional view of the upper portion of such an outboard installation. In this embodiment of the invention, the bearing structure per se, i.e., the bearing shell, bearing pads, bearing buttons, and bearing button retainers are substantially identical to those described above and the same numbers are therefore applied to the corresponding parts. In the embodiment shown in FIG. 2, the bolts 22 not only hold the flange portion 20 of bearing shell 18 in place but also hold a mounting ring 108 in place. A circular gasket 110 is held between ring 108 and flange 20 to prevent the flow of oil thereinbetween. An aft seal assembly 112 is attached to the mounting ring 108 by bolts 114, and the flow of oil therebetween is blocked by a circular gasket 116. The aft seal assembly 112 contains a plurality of lip-type seals such as the seals 100 in FIG. 1 but a detailed showing of these seals is omitted for the sake of simplicity. These lip seals bear against a seal liner sleeve 118 which has a flange outboard end 120 that is connected to propeller hub 12 by means of bolts 122.

In the above-described outboard mounting for the bearing of this invention, it is necessary, of course, to place the ship in dry dock, and to remove the propeller in order to gain access to the aft seal assembly or to the bearing. It is not, however, necessary to remove the stern shaft as has been required in prior art installations. After the propeller hub 12 has been removed, the bearing pad 16 can be exposed for inspection by simply removing the bolts 22 and moving the aft seal 112 and its support ring 108 off the shaft 10. The upper and side pads 16 can then be removed if desired without jacking up the shaft 10, and the lower pads 16 can be removed by jacking up the shaft 10 first. If necessary, the bearing shell 18 can be readily removed by sliding it to the rear while the shaft 10 is jacked up. After the inspection and/or repair procedures have been completed, the bearing and aft seal assembly can be relatively easily reassembled with comparison to past practices.

Although this invention has been described in connection with several illustrative embodiments thereof, it should be understood that the invention it not limited to the disclosed embodiments since modifications can be made therein without altering the fundamental principles of this invention. For example, although the disclosed embodiments are both mounted in the stern tube of a ship, and although they are particularly adapted to meet the requirements of such mounting, it will be clear to those skilled in the art that the tilting pad bearing structure of this invention can also be used in other applications where ease of installation and removability are important considerations. Other modifications will be apparent to those skilled in the art, and this invention includes all such modifications as may fall within the scope of the following claims.

What I claim is:

1. In a tilting pad journal bearing for use in a structure having a shaft and a supporting frame, said bearing including a hollow cylindrical bearing shell removably connected to said frame, a plurality of bearing pads each tiltably engaged with the interior of said shell, the interior surface of each bearing pad being shaped to provide a bearing surface for said shaft, and a pair of relatively hard bearing buttons, one on each pad and cooperating one for each pad on the interior of the bearing shell, positioned in contact with each other and providing the contact between each pad and the interior of said shell, each pair of buttons being shaped on adjacent surfaces to provide a tiltable engagement between the corresponding pad and the interior of said shell, the improvement comprising a retainer for each pair of buttons for holding the same in tiltable contact with each other, means for removably fastening each retainer to the exterior surface of a corresponding pad, and means for removably fastening each retainer to said bearing shell, the last-mentioned fastening means being accessible from one end of said bearing shell.

2. The tilting pad journal bearing as defined in claim 1 wherein each retainer is loosely fastened to the exterior surface of the corresponding pad to allow a predetermined amount of tiltability between the pad and the retainer.

3. A tilting pad journal bearing as defined in claim 1 and further comprising an annular flange projecting outwardly from one end of said bearing shell, and endwise accessible bolts removably fastening said bearing shell to said supporting frame.

4. A tilting pad journal bearing as defined in claim 1 wherein there are a plurality of recesses in the inner periphery of said bearing shell, each recess being positioned to receive and seat a bearing button, and an outwardly sloping ramp surface extending from each recess to one end of said bearing shell for guiding the bearing button and associated parts into assembled position.

5. A tilting pad journal bearing as defined in claim 1 wherein the outer bearing button of each pair of bearing buttons is annular in shape and has its contact surface provided with annular projecting flanges, and wherein each retainer is shaped to fit over the adjacent outer bearing button and has an opening therein which is larger than the bearing button but smaller than the flange thereof, whereby said outer bearing button is held in place by the engagement between said retainer and said flange.

6. A tilting pad journal bearing as defined in claim 1 wherein each retainer is removably fastened to the exterior surface of the corresponding bearing pad by means of bolts that extend through corresponding openings in said retainer and engage threaded openings in said pad, the openings in each retainer being larger than the stems of said bolts by a predetermined amount and there being means spacing the heads of said bolts from the adjacent surface of the retainer by a predetermined amount to permit a predetermined degree of tiltability between each bearing pad and the corresponding retainer.

7. A tilting pad journal bearing as defined in claim 3 wherein each of said retainers has an outwardly projecting flange on that end thereof which corresponds with the flanged end of said bearing shell, there being bolts removably securing the flange of each retainer to said bearing shell, whereby said bolts are accessible from the same location and direction as the bolts which fasten said bearing shell to the supporting frame to thereby expedite the installation and removal of said tilting pad journal bearing.

8. A tilting pad journal bearing as defined in claim 7 wherein said supporting frame is part of the stern of a ship, said bearing being removably fastened to said stern frame, and wherein the flanges of said bearing shell and said retainers are positioned on the inboard side of said bearing to permit inboard installation and removal of said bearing while the ship is in the water.

9. A tilting pad journal bearing as defined in claim 8 and further comprising an aft stern tube seal removably fastened to said stern frame and outboard of said bearing, and wherein the means fastening said aft stern tube seal to said stern part is positioned on the inboard side of said seal to permit inboard installation and removal thereof.

10. The combination defined in claim 9 and further comprising means for sealing said stern tube aft of said stern tube seal to prevent the entry of water when said stern tube seal is removed.

* * * * *